Sept. 7, 1937.   T. W. MILLER   2,092,400
VALVE MEANS
Filed July 1, 1935
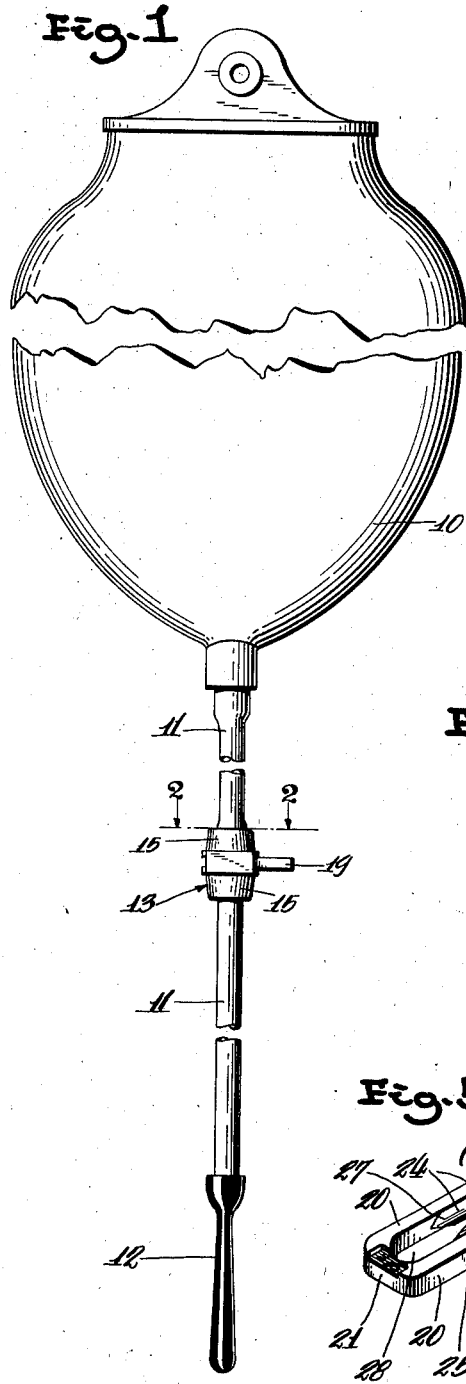
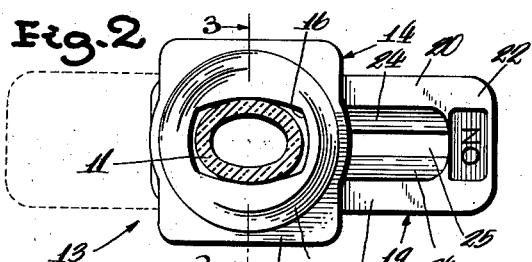
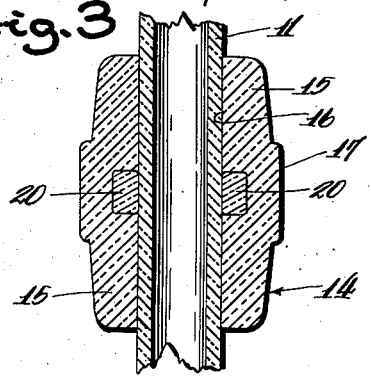
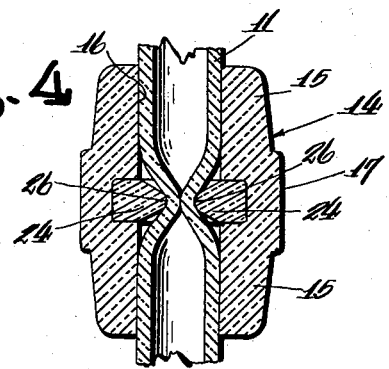
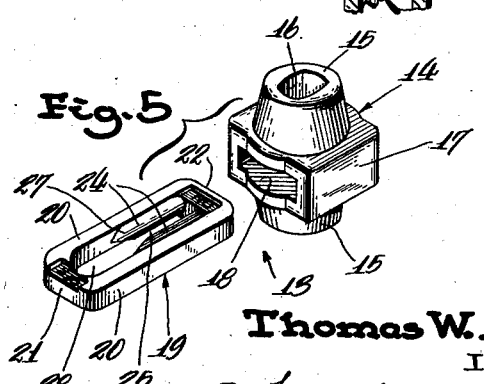
Thomas W. Miller
INVENTOR
BY Freeman, Sweet, Albrecht and Weidman
ATTORNEYS Patented Sept. 7, 1937

2,092,400

UNITED STATES PATENT OFFICE 2,092,400

VALVE MEANS

Thomas W. Miller, Ashland, Ohio, assignor to The Faultless Rubber Company, Ashland, Ohio, a corporation of Ohio Application July 1, 1935, Serial No. 29,212

8 Claims. (Cl. 251—5)

This invention relates to valve means, more particularly adapted for use with flexible conduits such as those employed in connection with fountain syringes, and has for an object the provision of new and improved valve means of this character.

In the drawing accompanying this specification and forming a part of this application, I have shown, for purposes of illustration, one embodiment which my invention may assume, and in the drawing:

Figure 1 is a broken, elevational view of a fountain syringe, disclosing the valve means associated with the flexible discharge conduit thereof, Figure 2 is an enlarged horizontal sectional view, corresponding substantially to the line 2—2 of Figure 1, Figure 3 is an enlarged vertical sectional view corresponding substantially to the line 3—3 of Figure 2, and showing the valve means in one position of operation, Figure 4 is a view similar to Figure 3, and showing the valve means in another position of operation, while Figure 5 is a perspective view of the valve means per se.

The embodiment herein disclosed comprises a flexible rubber syringe bag 10 to which is attached a flexible rubber discharge conduit tube 11, preferably oval in cross-section, to the discharge end of which is attached a usual type of discharge nozzle 12.

Associated with the flexible conduit tube 11, at any suitable place along its length, are valve means indicated generally by the reference character 13.

The valve means 13 comprise a tubular body portion 14 of relatively hard rubber, tapered exteriorly at its opposite ends, as indicated at 15, having a bore 16 extending longitudinally therethrough, which is formed oval in cross-section to correspond to the oval cross-section of the conduit tube 11, and through which the said tube 11 is adapted to extend, the bore 16 being of such size as to accommodate the tube 11 snugly without compressing the same, and large enough to permit the body portion 14 to be slid along the tube 11.

Substantially midway between its ends, the body portion 14 is provided with a transversely extending, enlarged portion 17, substantially square in configuration, when viewed from either end, and the enlarged portion 17 is provided with a transversely extending guide slot 18, generally oblong rectangular in cross-section, intersecting the oval bore 16, and opening at opposite sides of the enlarged portion 17, the guide slot extending and opening in a direction parallel to the major axis of the oval formation of the bore 16.

Cooperable with the body portion 14 and adapted to be slidably accommodated in the guide slot 18 thereof, are regulating means 19 preferably formed of hard rubber, substantially oblong rectangular in plan, having side members 20, and connected end members 21 and 22, the regulating means 19 also being formed oblong rectangular in cross-section, and of a contour so as to be relatively snugly accommodated in the slot 18 for endwise sliding movement. The side members 20 of the regulating means 19 at their inner sides, and extending longitudinally from the end member 22 approximately half-way toward the end member 21, have constricting ribs 24, spaced apart a predetermined distance so as to provide a constriction 25 sufficient to squeeze the conduit tube 11 tightly shut (Figure 4) when said tube is entered into the constriction 25, the adjacent edges of the ribs 24 being relatively sharp but rounded, as indicated at 26, while the ends of the ribs 24 are tapered, as at 27, to facilitate entrance of the tube 11 into the constriction 25. Between the ends of the ribs 24 and the end member 21, the inner surfaces of the side members 20 and the end member 21, are formed to provide an oval-contoured opening 28 to accommodate the tube 11 relatively loosely therewithin. The end member 22, adjacent the constriction 25, is somewhat depressed, and indicia comprising the word "on" is embossed thereon, and the opposite end member 21 has the word "off" embossed thereon.

The valve means 13 are readily assembled with respect to the conduit tube 11 by inserting the regulating means 19 into the slot 18 with the opening 28 in line with the bore 16, and then threading the conduit tube 11 through the aligned openings. The parts of the valve means 13 are thus attached to the tube, and when in the position shown in Figure 3, the tube 11 is entirely open for the passage of fluid therethrough, the word "on", adjacent the projecting constricted portion being plainly visible. When it is desired to cut off flow of fluid through the tube 11, the regulating means 19 are bodily shifted along the slot 18 to cause the tube 11 to enter the constriction 25, entrance being facilitated by the tapered portions 27 of the ribs 24, and these ribs 24 bearing upon the tube 11, squeeze the walls thereof together, as shown in Figure 4, and prevent flow of fluid therethrough, the portion of the regulating means 19 which then projects from the opposite side of the body portion 14, displaying the word "off" in the manner before described in connection with the word "on".

It will be apparent to those skilled in the art that the embodiment herein disclosed accomplishes at least the principal object of the invention, but also, that the construction is adaptable to a wide variety of uses, and embodies advantages other than those herein discussed, and also, that the particular embodiment may be variously changed and modified without departing from the spirit or scope of the invention, and accordingly, it will be understood that the above disclosure is illustrative only, and that my invention is not limited thereto.

I claim:

1. Valve means for a flexible conduit, comprising: a valve body portion cooperatively assembled with said flexible conduit; and regulating means carried by said body portion, bodily shiftable with reference to said body portion and with reference to said conduit, said regulating means being formed of a single piece of material, having an opening adapted to loosely encircle said flexible conduit to permit free passage of fluid therethrough, when said regulating means is bodily shifted in one direction, and said regulating means having spaced ribs formed with reduced edges defining a constriction communicating with said opening, and adapted for the reception of said flexible conduit, to constrict said conduit and to cut off passage therethrough when said regulating means is bodily shifted in a different direction.

2. Valve means for a flexible conduit, comprising: a valve body portion in the form of a sleeve adapted to encircle said flexible conduit, and having a bore therethrough generally oval in cross-section, said bore being operable to impart a generally oval-shaped contour to at least the adjacent portion of said conduit and regulating means carried by said body portion, bodily shiftable with reference to said body portion and with reference to said conduit, said regulating means being formed of a single piece of hard rubber, having an opening adapted to loosely encircle said flexible conduit to permit free passage of fluid therethrough, when said regulating means is moved in one direction, and said regulating means having spaced ribs formed with reduced edges and defining a constriction for the reception of said flexible conduit with the major axis of the oval section parallel with the direction of movement of said regulating means, said ribs being operable to constrict said conduit and cut off passage of fluid therethrough when said regulating means is moved in an opposite direction.

3. Valve means for a flexible conduit, comprising: a valve body cooperatively assembled with said flexible conduit; and regulating means carried by said body portion and being bodily shiftable with reference to said body portion and with reference to said conduit, said regulating means having an opening for the passage of said conduit, said opening including an enlarged portion, a constricted portion, and a tapered portion effecting communication between said enlarged and constricted portions, said regulating means being movable to one position wherein said enlarged portion cooperates with said conduit to provide for unobstructed flow through said conduit, and being moved towards another position wherein said tapered portion partially constricts said conduit to provide for partially obstructed flow therethrough, said regulating means when moved to said other position providing for the cooperation of said constricted portion with said conduit to fully constrict said conduit and completely obstruct flow therethrough.

4. Valve means for a resilient conduit, comprising: a body embracing the conduit; and regulating means carried by said body and shiftable transversely of the conduit, said regulating means having a recess, the margins of which are adapted to engage the adjacent surface of the conduit, said recess comprising a restricted portion and a portion enlarged with respect to said restricted portion, said enlarged portion providing passage through the conduit when said regulating means is shifted to one position, and said restricted portion constricting the conduit and interrupting passage therethrough when said regulating means is shifted to another position.

5. Valve means for a resilient conduit, comprising: a valve body, having a passage for receiving the conduit; and regulating means, shiftable with respect to said body and the conduit, and having a recess including a narrowed portion into which the conduit is received when said regulating means is shifted to one position, the walls of said narrowed portion engaging spaced-apart portions of the conduit, and constricting the conduit therebetween, to obstruct communication through the conduit.

6. Valve means for a resilient conduit, comprising: a valve body, having a passage for receiving the conduit; and regulating means, shiftable with respect to said body and the conduit, and having a recess comprising an enlarged portion and a restricted portion; said recess being so constructed and arranged that when said regulating means is in one position the conduit lies within the enlarged portion of said recess, and communication through the conduit is permitted, and when said regulating means is shifted to another position, the walls of said restricted portion engage spaced-apart portions of the conduit, and constrict the conduit therebetween, to obstruct communication through the conduit.

7. Valve means for a resilient conduit, comprising: a valve body, having a passage for receiving the conduit; and regulating means, shiftable with respect to said body and the conduit, and having a portion engageable with a part of the conduit; said portion being constructed and arranged to move relative to such engaged part of the conduit, to constrict the conduit at that place when said regulating means is moved to one position.

8. Valve means for a resilient conduit, comprising: a valve body, having a passage for receiving the conduit, and having also a transverse aperture traversing said passage and extending into the wall of said body on opposite sides of said passage; and regulating means, shiftably mounted in said aperture, and having a portion so constructed and arranged, that when said regulating means is shifted to one position, said portion constricts the conduit, to obstruct communication through the conduit.

THOMAS W. MILLER.